United States Patent
Edwards et al.

(10) Patent No.: US 12,476,965 B2
(45) Date of Patent: Nov. 18, 2025

(54) IDENTIFICATION CARD BASED MULTI-FACTOR AUTHENTICATION

(71) Applicant: Capital One Services, LLC, McLean, VA (US)

(72) Inventors: Joshua Edwards, Philadelphia, PA (US); Justin Anthony Bowers, Richmond, VA (US); Lea Cody, Washington, DC (US); Elaina Teramoto, McLean, VA (US); Tyler Maiman, Melville, NY (US); Mary Sweeney, Wilmington, DE (US); Erik Neighbour, Arlington, VA (US); Anantha Swarna Kavi, Clarksburg, MD (US)

(73) Assignee: Capital One Services, LLC, McLean, VA (US)

( * ) Notice: Subject to any disclaimer, the term of this patent is extended or adjusted under 35 U.S.C. 154(b) by 10 days.

(21) Appl. No.: 18/435,351

(22) Filed: Feb. 7, 2024

(65) Prior Publication Data
US 2025/0254158 A1    Aug. 7, 2025

(51) Int. Cl.
*H04L 9/40*   (2022.01)
*G06N 3/084*  (2023.01)

(52) U.S. Cl.
CPC ......... *H04L 63/0853* (2013.01); *G06N 3/084* (2013.01); *H04L 63/0861* (2013.01)

(58) Field of Classification Search
CPC .. H04L 63/0853; H04L 63/0861; G06N 3/084
See application file for complete search history.

(56) References Cited

U.S. PATENT DOCUMENTS

| | | | | |
|---|---|---|---|---|
| 9,160,742 | B1 * | 10/2015 | Ackerman | .......... H04L 63/0876 |
| 11,379,591 | B2 * | 7/2022 | Jochems | ................. G06F 21/34 |
| 11,798,059 | B2 * | 10/2023 | Nosrati | .................. G06N 3/084 |
| 12,333,028 | B2 * | 6/2025 | Doyle | ................... H04L 63/108 |

* cited by examiner

Primary Examiner — Abiy Getachew
(74) Attorney, Agent, or Firm — Foley & Lardner LLP

(57) ABSTRACT

Systems and methods for improvements to multifactor authentication (MFA) techniques are described herein. The improved and enhanced MFA techniques can leverage user interaction data to predict an entity-issued user-specific identification document that an authorized user of an authorized user account is most likely to carry on their person. Upon a request to access an authorized user account being received, the improved and enhanced MFA techniques can request that the user capture, in real-time, an image depicting the predicted identification document. Using additional artificial intelligence, a determination may be made as to whether the image depicts a real instance of the entity-issued user-specific identification document. This determination may result in access to the authorized user account being provided or denied.

20 Claims, 8 Drawing Sheets

IDENTIFICATION CARD BASED MULTI-FACTOR AUTHENTICATION

BACKGROUND

Multi-factor authentication (MFA) is a known process for authenticating a user (e.g., for accessing a secure account) where two or more steps are required to authenticate a user. While traditional authentication steps, like usernames and passwords, can be effective, MFA provides an enhanced level of security that is more difficult to crack.

Unfortunately, fraudsters are becoming savvier—employing new techniques to spoof users during MFA steps to gain unauthorized access to user information (e.g., email, health data, financial information, etc.). Techniques like one-time passwords (OTP), which have previously been effective in preventing account hacking, no longer provide adequate security. Therefore, new MFA techniques are needed to provide enhanced/improved cryptographically-secured access to authorized user accounts and private data stored therein.

SUMMARY

In view of the technical problems associated with existing MFA techniques, systems and methods disclosed herein describe a process for providing enhanced/improved cryptographically secured access to authorized user accounts and the private data stored therein. Authentication techniques, particularly MFA, benefit from prompting users to input criteria only an authorized user—and oftentimes a specific authorized user—could provide. The processes described herein harness unconventional MFA steps, such as leveraging historical user interactions to predict an item that the authorized user would most likely have and be able to take a picture of. For example, by analyzing past user interactions, it can be determined that a user frequents a merchant every day. If that merchant is known to provide members with identification documents, such as membership cards or loyalty cards, then there is a strong likelihood that the user will have their own merchant-issued membership card at most times (e.g., stored in one's wallet). Using this knowledge, if that user's authorized user account is attempting to be accessed, authentication may be performed by requiring the user to capture an image of the merchant-issued membership card and submit the image for verification. If the image is determined to depict the merchant-issued membership card, then this can provide a strong indication that the request to access the authorized user account originated from an authorized user.

A user's prior interactions with a set of entities can provide insight into the user's behaviors and clues as to what items the user may possess with them at a given time, where the user may be located at a given time, who the user may be with, or other real-time aspects of the user. For example, a user that frequently (e.g., daily, weekly) visits a subscription-based marketplace may be more likely to carry that subscription-based marketplace's identification card on their persons, as it may be needed to access the services provided by the marketplace, as compared to an identification card of a gym the user is a member of but visits only sporadically. Furthermore, the identification card that a given user currently possesses on their persons may be difficult for a fraudster to accurately predict. For instance, it is unlikely that a fraudster will currently have a specific entity's identification document that a user is predicted to have on their persons. Even if, for example, the identification document was ubiquitous enough to be possessed by a large population of individuals, it is extremely unlikely that an unauthorized user will have immediate access to the specific identification document predicted to be in the possession of the authorized user. Thus, the enhanced/improved MFA steps described herein reduces the likelihood that an authorized user account is accessed by an unauthorized user.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
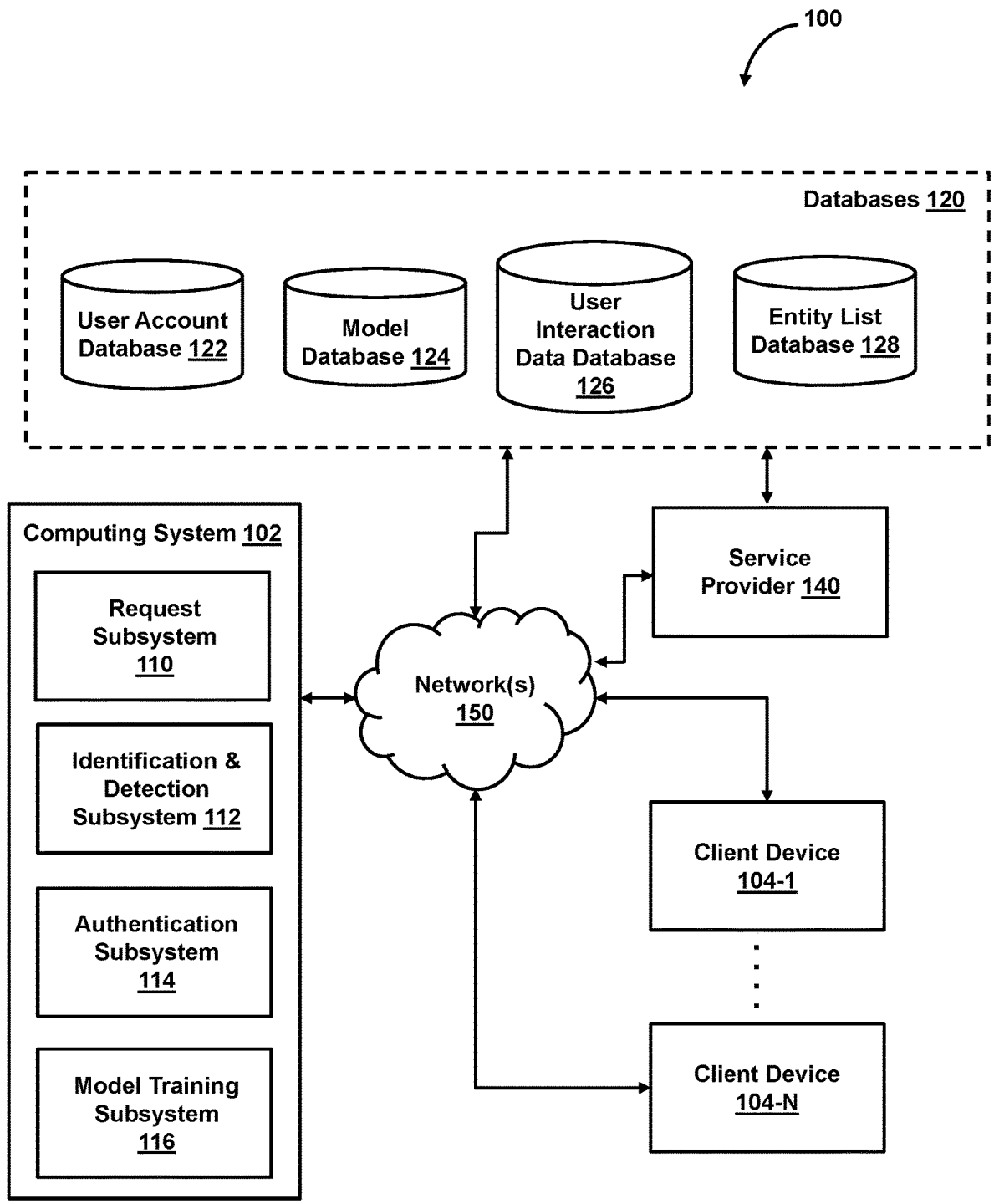
FIG. 1 is an illustrative diagram of an example system for providing cryptographically-secure access to an authorized user account, in accordance with various embodiments.

FIG. 1 is an illustrative diagram of an example system for providing cryptographically-secure access to an authorized user account, in accordance with various embodiments. In some embodiments, system 100 may include computing system 102, client devices 104-1 thru 104-N (collectively referred to as "client devices 104" and individually referred to as "client device 104"), databases 120 (including a user account database 122, a model database 124, a user interaction data database 126, and an entity list database), a service provider 140, and/or other components. Computing system 102, client devices 104, and service provider 140 may communicate with one another and/or databases 120 via network 150. Although a single instance of computing system 102 and service provider 140 are represented within system 100, multiple instances of computing system 102, service provider 140, or any other component of system 100, may be included, and the single instance of each is to minimize obfuscation within FIG. 1.

Network 150 may be a communications network including one or more Internet Service Providers (ISPs). Each ISP may be operable to provide Internet services, telephonic services, and the like, to one or more client devices, such as client device 104. In some embodiments, network 150 may facilitate communications via one or more communication protocols, such as TCP/IP, HTTP, WebRTC, SIP, WAP, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Client device 104 may include one or more processors, memory, communications components, and/or additional components (e.g., display interfaces, input devices, etc.). Client device 104 may include any type of mobile terminal, fixed terminal, or other device. By way of example, client device 104 may include a desktop computer, a notebook computer, a tablet computer, a smartphone, a wearable device, or other client device. Users may, for instance, utilize client device 104 to interact with one another, service provider 140, computing system 102, one or more servers, or other components of system 100.

Service provider 140 may correspond to an entity that provides a service or services accessible by one or more users via client devices 104. For example, service provider 140 may provide social media services, health services, financial services, educational services, email/messaging services, and the like. In some embodiments, users may have authorized user accounts with service provider 140. The authorized user accounts may store private and/or non-private data associated with the user. For example, a user's authorized user account may store user identification information (e.g., address, phone number, email address, social security number, employee identification number, etc.), user financial information (e.g., bank account information, credit card information, digital currency information, etc.), user health information (e.g., medical records), user educational information (e.g., academic records), and the like. Furthermore, access to a service provided by service provider 140 may include a human element, such as, for example, a gym service, an athletic service, a travel service, and accessibility service, and the like.

In some embodiments, user account database 122 may store information associated with various authorized user accounts, such as those with service provider 140. For example, as seen with reference to FIG. 2A, user account database 122 may include data structure 200 storing user account information. As seen by data structure 200, each authorized user account may include an account identifier UA1-UAM and a plurality of identification features (e.g., identification features A-N). For example, the authorized user account associated with account identifier UA1 may include identification features FA1, FB1, . . . FN1; the authorized user account associated with account identifier UA2 may include identification features FA2, FB2, . . . , FN2; and the authorized user account associated with account identifier UAM may include identification features FAM, FBM, . . . , FNM. In some examples, different authorized user accounts may include different quantities of identification features. In some embodiments, one or more users may be authorized to access the information stored within a given authorized user account. In this scenario, the identification features may include identification features for each user authorized to access the authorized user account.

The identification features may include features that are derived from user interactions, user provided information, entity provided information, and the like, however these features may also be input manually and/or predicted using one or more machine learning models. Some examples of identification features A-N include images (or encoded representations, such as embeddings, of the images) depicting one or more entity-issued user-specific identification documents, one or more government-issued identification documents, one or more known physical structures or objects, and the like. Some examples of identification features A-N may also include facial images of a user, biometric data of the user, user contact information (e.g., address, phone number, email), and the like. In one or more examples, identification features A-N may include images and/or embeddings representing the images.

In some embodiments, service provider 140 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. In providing, maintaining, managing, or otherwise offering financial services, service provider 140 may be enabled to authenticate financial transactions and/or other transactions, or other authentication tasks, such as those associated with one or more services available to users having authorized user accounts (e.g., user account identifiers UA1-UAM. In some embodiments, service provider 140 may include one or more computing devices configured to perform one or more operations consistent with disclosed embodiments. In one or more examples, service provider 140 may include one or more servers or server systems. In one or more examples, service provider 140 may include one or more processors configured to execute software instructions stored in a memory or other storage device. The one or more processors may be configured to execute the stored software instructions to perform internet-related communication, financial service-based processes, and machine learning processes for cryptographically providing secure access to an authorized user account.

In some embodiments, computing system 102 may be configured to determine whether cryptographically-secure access to an authorized user account is to be provided. For example, user account database 122 may securely store information related to authorized user accounts. Each authorized user account may be associated with a user authorized in advance to be granted access to some or all of the information stored in the authorized user account. In some embodiments, each authorized user account may correspond to an account with a service provider, such as service provider 140. For example, if service provider 140 were a social media service provider, then the authorized user accounts associated with service provider 140 and stored in user account database 122 may correspond to social media user accounts with the social media service. As another example, if service provider 140 were a financial service provider, then the authorized user accounts associated with service provider 140 and stored in user account database 122 may correspond to financial accounts with the financial service.

Computing system 102 may include one or more subsystems, such as request subsystem 110, Identification & detection subsystem 112, authentication subsystem 114, model training subsystem 116, or other subsystems. Computing system 102 may include one or more processors, memory, and communications components for interacting with different aspects of system 100. In some embodiments, computer program instructions may be stored within memory, and upon execution of the computer program instructions by the processors, operations related to some or all of subsystems 110-116 may be effectuated.

In some embodiments, request subsystem 110 may be configured to receive a request to access an authorized user account. As mentioned above, certain users may be authorized to access the authorized user accounts. In one or more examples, the request may be related to a transaction attempt. For example, the request may be to access financial information, such as credit card numbers, bank routing numbers, and the like, stored within a corresponding authorized user account (e.g., user account UA1 of FIG. 2A). In one or more examples, the request may be related to a modification/update to one or more stored identification features of the user stored within the user's authorized user account. For instance, the request may be for updating personal contact information stored by an authorized user account. Alternatively, the request may be related to other use cases, each attempting to gain access to information stored within an authorized user account.

In one or more examples, request subsystem 110 may be configured to determine a request risk score based on the received request to access the authorized account. For example, based on the request, request subsystem 110 may be configured to determine a request risk score. The request risk score may indicate how much risk the received request places on the authorized user account. The request risk score may be a numerical value (e.g., a number between 0 and 100, where 0 indicates no risk and 100 indicates the most risk), a discrete value (e.g., Tier 1, Tier 2, . . . , Tier L, etc., where Tier 1 indicates the greatest risk and Tier L indicates the least risk), and the like. In some examples, request subsystem 110 may be configured to determine whether the request risk score satisfies a request risk threshold condition. In one or more examples, the request risk threshold condition may be satisfied if the request risk score is determined to be greater than or equal to a request risk threshold score. For example, the request risk threshold score may be a numerical value (e.g., 80 or greater, 90 or greater, 95 or greater, etc.), however the request risk threshold score may also be a discrete value (e.g., Tier 2). If it is determined that the request risk score satisfies the request risk threshold score, then this may indicate that the request risk score is greater than the request risk threshold score and enhanced MFA steps may be needed.

Figure 2A:
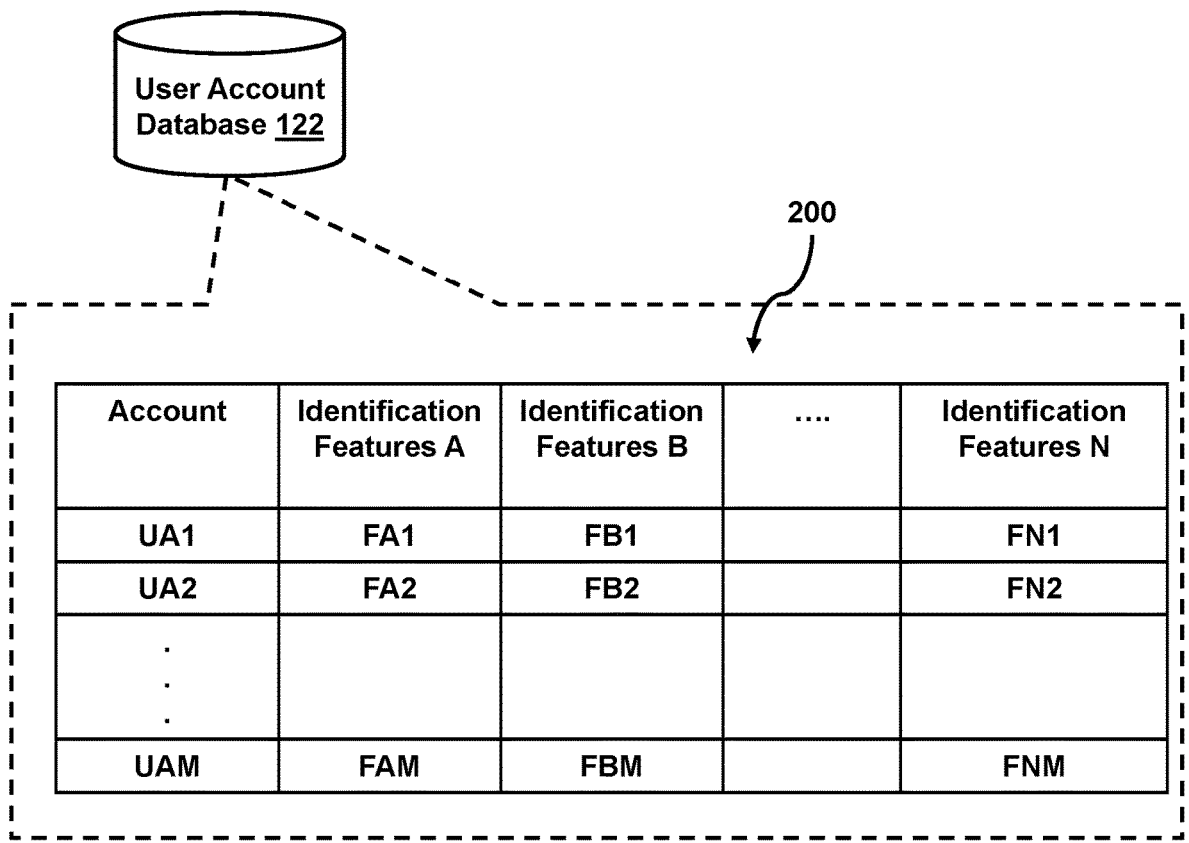
FIGS. 2A-2D illustrate example databases and data structures stored therein, in accordance with various embodiments.
Figure 2B:
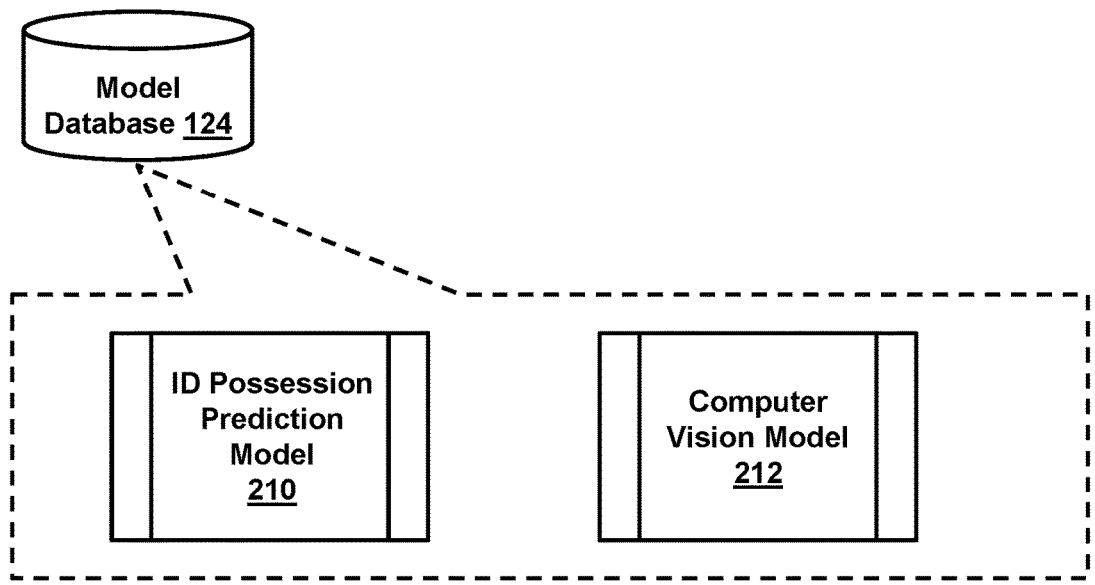
Figure 2C:
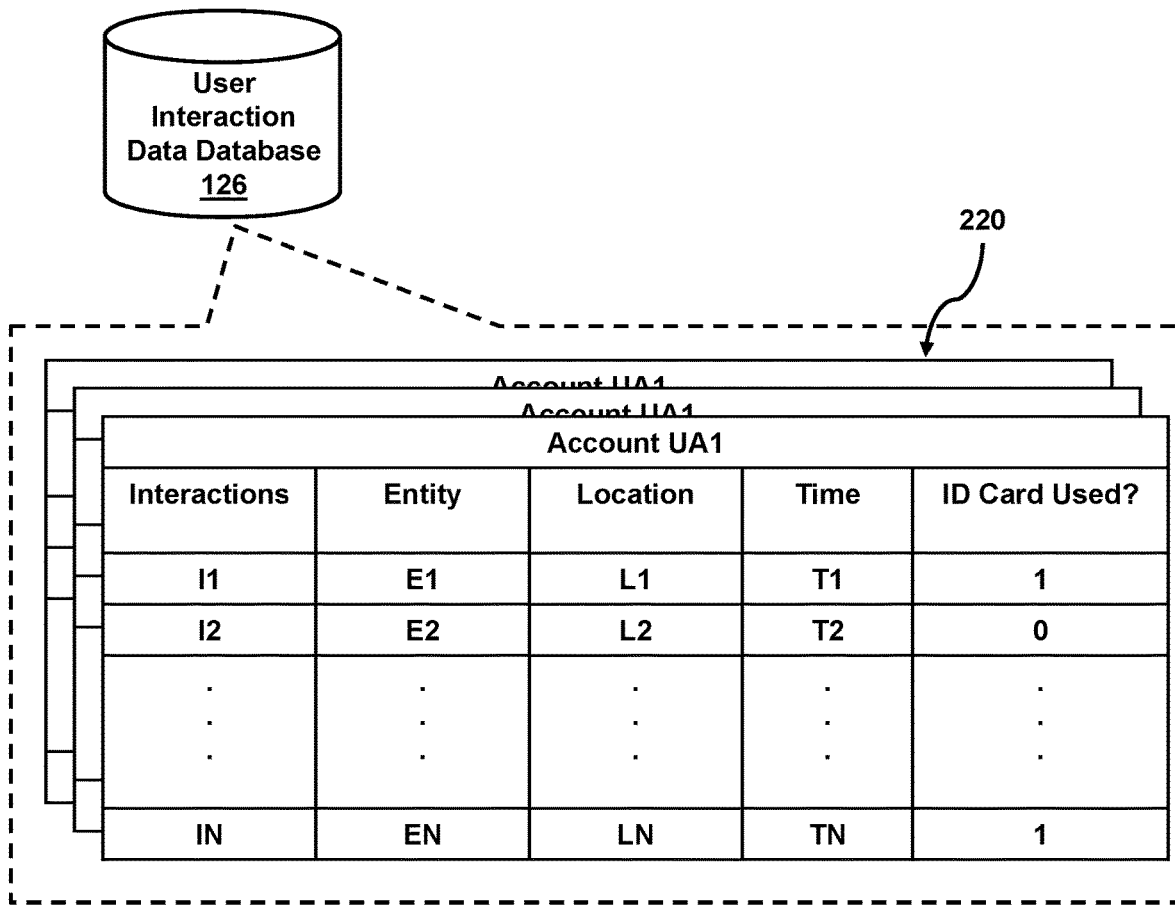

In some embodiments, request subsystem 110 may determine that MFA is needed to allow access to the authorized user account of the user. For example, the request itself may indicate that the enhanced (cryptographically-secure) MFA is needed, such as with a metadata flag. As another example, the determination that the enhanced MFA is needed may be based on the request risk score satisfying the request risk threshold condition. The request risk threshold condition may be satisfied if the request risk score is greater than or equal to a request risk threshold score. As still another example, the determination that the enhanced (cryptographically-secure) MFA is needed may be based on the system from which the request originated (e.g., a particular entity known to have a higher amount of risk), the time of day, the day of the week, the time of year, the amount associated with the request (if there is a monetary sum connected to the request), past risk events, or combinations thereof. In one or more examples, user interaction data comprising the prior interactions of the user may be retrieved based on the request risk score satisfying the request risk threshold score. For example, as described below with respect to FIG. 2C, user interaction data 220 may be retrieved from user interaction data database 126. In some embodiments, request subsystem 110 may be configured to retrieve user interaction data 220 associated with a particular authorized user account for which access has been requested. In one or more examples, the user interaction data comprises prior interactions of the user with a set of entities. For example, as seen in FIG. 2C, user interaction data 220 may include a plurality of prior interactions (e.g., interactions I1-IN) of a given authorized user account (e.g., the authorized user account UA1).

Interactions I1-IN may correspond to any interaction between an authorized user of the authorized user account and another user, entity, server, database, etc. For example, one form of interaction may be a transaction, such as a financial transaction leveraging financial information stored in the authorized user account. Another form of interaction may refer to a data transmission to another entity (e.g., a message). Each interaction may include a corresponding entity (e.g., entities E1-EN), with which the interaction was directed or received. Stored with each interaction may also be a location (e.g., locations L1-LN) and time (e.g., times T1-TN) indicating where and when the interaction occurred. In some examples, the location may be represented using an IP address. User interaction data 220 may further include an indicator specifying whether an entity-issued user-specific identification document was used or present during the interaction. For example, the indicator may have the label "1" when an entity-issued user-specific identification document was used during a given interaction occurred (e.g., interaction I1) or the label "0" when no entity-issued user-specific identification document was used (e.g., as is the case for interaction I2).

As described herein, an entity-issued user-specific identification document refers to a physical item that is issued by a specific entity, such as a merchant or service, for a specific user. An illustrative example is an identification (ID) card used to identify a user with a merchant. The entity-issued user-specific identification document may be used to authenticate that user with that entity. Some examples of physical items that may be used as entity-issued user-specific identification documents include a merchant membership card, a student identification card, an employee identification card, and the like. In some embodiments, the entity-issued user-specific identification document may include indicia specific to the issuing entity, the associated user, or both. For example, a logo, entity name, username, user-entity identification number, or other identifying information associated with the entity (e.g., address, phone number, etc.) may be present (e.g., visible) on the entity-issued user-specific identification document. As another example, the entity-issued user-specific identification document may include an image of the user's face, the user's name, the user's date of birth, the user's entity identification number, or other information that can be used by the entity to identify the user. In some examples, the entity-issued user-specific identification document may be a physical item having a size or shape that facilitates easy and convenient transportation by the user. For example, the entity-issued user-specific identification document may have a shape and size the same or similar to that of a driver's license or credit card. This can increase the likelihood that the user will have that item on their person. In one or more examples, the entity-issued user-specific identification document may be a wearable item or device that is adorned by the user (e.g., on one's clothing or body). Persons of ordinary skill in the art will recognize that the term "to carry on one's person(s)" refers to situations where a particular item of interest, in this example an entity-issued user-specific identification document, is either carried by the user (e.g., within one's wallet, pocket, bag, etc.) or within quick and easy retrieval by the user (e.g., the item is located in an adjacent room or within a predefined distance of the user). In some examples, the entity-issued user-specific identification document may be a digital document, such as a digital identification document stored in memory on one's mobile device or in cloud storage.

Figure 2D:
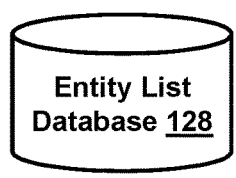

Returning to FIG. 1, Identification & detection subsystem 112 may be configured to obtain a list of entities that are known to issue physical user identification cards. For example, each entity included in the list is known to issue their own physical user-specific identification document. In particular, some embodiments include entities within the list based on the uploading of a reference image of a reference entity-issued identification document. This reference image may be of an entity-issued user-specific identification document, or may be user agnostic (e.g., without user identifiable information). In one or more examples, the list of entities includes at least one of the set of entities (e.g., the entities with which the user had one or more prior interactions). In some embodiments, the list of entities may be stored in entity list database 128. For example, with reference to FIG. 2D, list of entities 240 stored in entity list database 128 may include entities E1-EN. In some embodiments, list of entities 240 may include each entity that the user has had some prior interaction with. In this example, list of entities 240 may also include a flag indicating whether that entity is known to issue their own identification card (e.g., label "1") or if that entity is not known to, or does not, issue their own identification card (e.g., label "0"). If the entity does issue an identification document, the entity list may also store an image of that entity-issued identification document to serve as a reference image. In some examples, multiple images of an entity-issued identification document may be stored in a list of entities 240 (e.g., from different angles, different versions, etc.). In some embodiments, an embedding or other representation of the reference image may be stored instead of or in addition to the reference image of that identification document.

Returning to FIG. 1, in some embodiments, Identification & detection subsystem 112 may be configured to predict, using a trained artificial intelligence model, based on the request, the user interaction data, and the list of entities, a physical user identification card associated with an entity (e.g., an entity-issued user-specific identification document) from the set of entities that the user is predicted to currently carry on their person. In one or more examples, Identification & detection subsystem 112 may be configured to retrieve the trained artificial intelligence model from model database 124. As an example, with reference to FIG. 2B, model database 124 may store ID possession prediction model 210, computer vision model 212, or other models. For example, using ID possession prediction model 210 (e.g., the trained artificial intelligence model), Identification & detection subsystem 112 may predict an entity-issued user-specific identification document—a physical user identification card—that is currently possessed by the user (i.e., the user carries a tangible copy of the entity-issued user-specific identification document in their wallet, bag, etc.) based on the request, the prior interactions of the user with the set entities, and the list of entities (e.g., list of entities 240).

In some examples, predicting the physical user identification card includes Identification & detection subsystem 112 filtering the list of entities based on the set of entities. The filtering can identify, in some embodiments, (i) a subset of entities with whom the user has had a prior interaction and (ii) a subset of the prior interactions associated with the subset of entities. In other words, the entities included in list of entities 240 (e.g., entities E1-EM) may be compared to the entities included in user interaction data 220 (e.g., entities E1-EN). If an entity from user interaction data 220 is also included in list of entities 240, then this indicates that the user may possess an identification document issued by that entity. Some examples include identifying the subset of prior interactions by determining each transaction (of interactions I1-IN) stored in user interaction data 220 that includes an entity from list of entities 240.

Identification & detection subsystem 112 may further be configured to determine, based on the subset of the prior interactions, a frequency that the user interacted with each entity of the subset of entities. The frequency may be input, using Identification & detection subsystem 112, to the trained artificial intelligence model (e.g., ID possession prediction model 210) to determine how likely it is that the user carries that entity's identification card on their person. As an example, a user who frequently (e.g., weekly) shops at a membership-based grocery store may be more likely to physically carry that grocery store's membership card on their persons (e.g., in their wallet) as compared to a membership card of the user for a rental movie store. In one or more examples, ID possession prediction model 210 may use location information and temporal information stored in user interaction data 220 to determine a likelihood of the user possessing a given identification document at the time of the request's receipt. For example, the time of day (e.g., morning, afternoon, evening) and/or location (e.g., home, work, etc.) may indicate which entity-issued user-specific identification document the user likely has on their person at that moment.

In some embodiments, determining the entity-issued user-specific identification document comprises generating, using the trained artificial intelligence model (e.g., ID possession prediction model 210), a set of entity-likelihood scores corresponding to the set of entities. Each entity-likelihood score may represent a likelihood that the user carries a corresponding entity-issued identification document on their persons. The entity-issued user-specific identification document may be selected based on the entity-likelihood score associated therewith. Based on the user's prior interactions, a likelihood that the user currently possesses multiple entity-issued user-specific identification documents may be calculated.

In some embodiments, Identification & detection subsystem 112 may be configured to retrieve user interaction data associated with the authorized user account based on the request. As mentioned above, user interaction data 220 associated with each user having an authorized account (e.g., authorized user accounts UA1-UAM) may be stored in user interaction data database 126. User interaction data 220 may, for example, comprise prior interactions of the user with the set of entities (e.g., entities E1-EN). Identification & detection subsystem 112 may further obtain the list of entities 240, which indicates entities known to issue tangible identification documents based on the request. Identification & detection subsystem 112 may be configured to filter the set of entities (e.g., entities E1-EN) based on list of entities 240 (e.g., entities E1-EM) to obtain a subset of entities that are known to issue tangible identification documents and with whom the user has previously interacted. In one or more examples, the entity-issued user-specific identification document may be selected from the subset of entities.

Returning to FIG. 1, in some embodiments, authentication subsystem 114 may be configured to identify, based on the authorized user account, a user device of the user with which to provide authentication instructions. For example, user identification features A-N of data structure 200 may include identification information for one or more user devices associated with a given user account. The user devices may include mobile devices, wearable devices, computing devices, smart devices, and the like. In some embodiments, the identification information may include an IP address of the user device, a MAC address of the user device, a serial number of the user device, or other information, or combinations thereof. In one or more examples, identification features A-N may further include information about a given user device. For example, an operating system, device type, applications, Wi-Fi status, phone number, and the like, may be stored for a given user's authorized user account.

In some embodiments, authentication subsystem 114 may be configured to send the authentication instructions to one or more user devices associated with the authorized user account. In some examples, the particular user device may be selected, if more than one is available, based on device type (e.g., mobile device may be selected over a desktop computer), frequency of use, previous authentication requests, predefined rules, and the like. However, certain examples include providing authentication instructions to each user device associated with the authorized user account. In this scenario, code to format the authentication instructions for different device types, operating systems, and/or hardware constraints may additionally be provided to the user devices.

The authentication instructions may comprise instructions to cause an image of the physical identification document to be captured using the user device. For example, the authentication instructions may be provided to client device 104 and may request that client device 104 employ one or more image capturing components of client device 104 to capture an image of the entity-issued user-specific identification document predicted to be possessed by an authorized user of the authorized user account. The authentication instructions may cause the user device to capture (i.e., automatically or in response to a user invocation) an image of the entity-issued user-specific identification document using the user device. For example, the user can use a camera component of their mobile device to capture an image of their entity-issued identification document.

Figure 3:
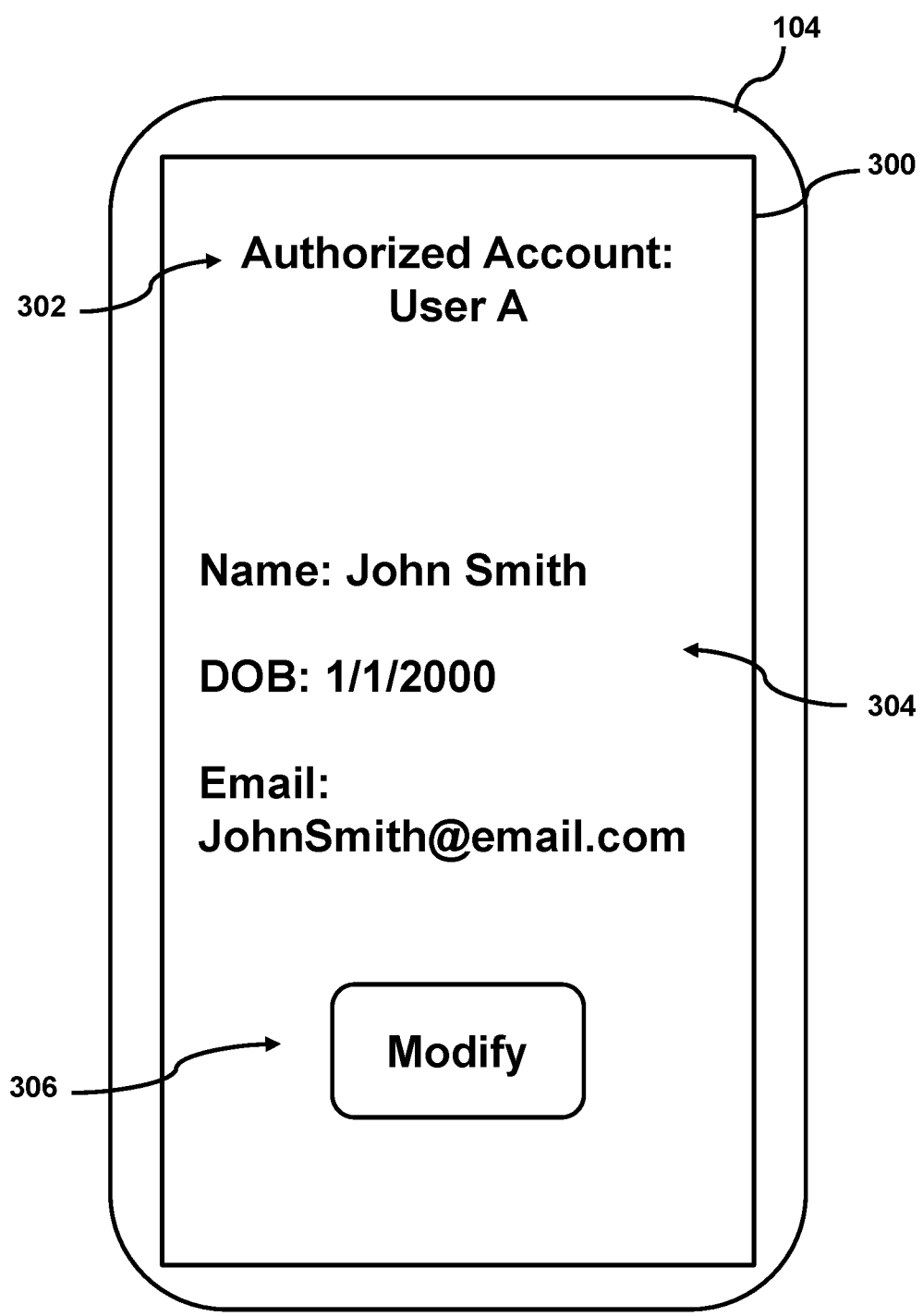
FIG. 3 illustrates an example user interface that enables modification to one or more secure user parameters, in accordance with various embodiments.

In some embodiments, authentication subsystem 114 may generate, or obtain, user interface data for rendering a user interface on the user device. For example, the authentication instructions may include the interface data. The user interface may include instructions for accessing an image capture component of the user device and capturing the image of a physical user identification card. As an example, with reference to FIG. 3, client device 104 may render user interface 300 on a display screen (e.g., a touchscreen display). In the example of FIG. 3, user interface 300 may present confidential/private user information. For example, user interface 300 may display graphics 302 and 304, representing a username, date of birth, email address, and the like. In some embodiments, a user viewing user interface 300 may seek to modify one or more aspects of the user information. To do so, the user may select a graphical user interface (GUI) 306, which may be a digital button. For example, the user can touch a portion of a display screen rendering GUI 306. However, because the information is private, additional security measures may be implemented, such as an enhanced MFA, to ensure that the user attempting to modify the information is authorized to do so. Persons of ordinary skill in the art will recognize that the use case of authorizing a user to modify user data is exemplary, and other use cases may be applicable (e.g., approving a financial transaction, viewing test results, logging into a secure website, etc.).

In some embodiments, the user interface data may access a camera resident on the user device (e.g., client device 104) and display the input data of the camera within a portion of the user interface. As an example, with reference to FIG. 4, user interface 400 may include a portion 406 that may present the view of the camera. Furthermore, the user interface data may include a graphical user interface (GUI) (e.g., a virtual button) that enables manual capture of an image (e.g., an image of a candidate entity-issued user-specific identification document). For example, user interface 400 may include GUI 408 that, when invoked, causes client device 104 to capture, using its resident camera(s), an image. In particular, the captured image may depict the field of view presented within portion 406 (e.g., including candidate entity-issued user-specific identification document 410). In one or more examples, the user interface data may also include instructions to facilitate auto-capture of the image. For example, instead of capturing an image in response to GUI 408 being invoked, the instructions may cause an image to be automatically captured upon some criteria being filled. For instance, upon generating a bounding box surrounding a depiction of candidate entity-issued user-specific identification document 410, identifying one or more indicia (e.g., facial image 412, logo 414, entity-user identification number 416), a voice command, or another trigger, or combination thereof, the instructions may cause the image to be captured.

In some embodiments, authentication subsystem 114 may be configured to calculate, using a trained computer vision model (e.g., computer vision model 212 of FIG. 2B), a user identification card score indicating a likelihood that the candidate entity-issued user-specific identification document depicted within the captured image is real. Computer vision model 212 may analyze various aspects of the captured image to determine whether the access to the authorized user account should be granted. For example, facial image 412, logo 414, entity-user identification number 416, or other aspects of the captured image depicting candidate entity-issued user-specific identification document 410, may be analyzed with computer vision model 212, which may output one or more confidence scores indicating how likely candidate entity-issued user-specific identification document 410 depicted within the captured image is the user's actual entity-issued identification document. In some examples, a confidence score may be computed for each indicia detected, where each confidence score indicates the likelihood that the corresponding indicia is not fraudulent. In some embodiments, the user identification card score may be determined based on the confidence scores.

Figure 4:
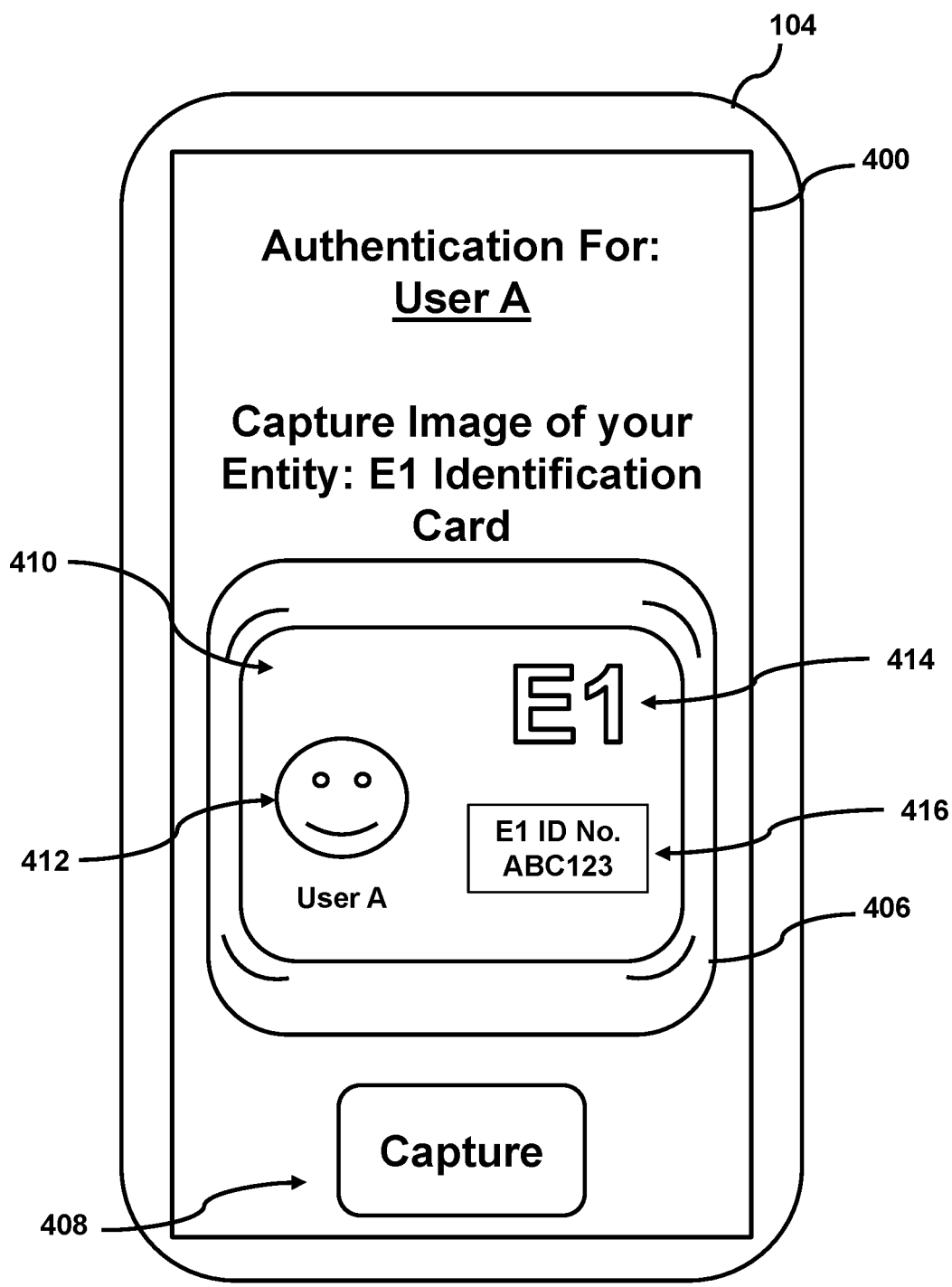
FIG. 4 illustrates an example user interface for capturing an image of a physical item possessed by a user for providing cryptographically-secure access to an authorized user account, in accordance with various embodiments.

In some examples, the trained computer vision model (e.g., computer vision model 212) comprises a facial recognition component, a character recognition component, a logo recognition component, or other components. For example, the facial recognition component of the trained computer vision model (e.g., computer vision model 212) may be trained to compute a facial recognition confidence score indicating a likelihood that at least a portion of the image depicts a face of the user. As depicted in FIG. 4, the captured image depicting candidate entity-issued user-specific identification document 410 may include facial image 412. The facial recognition component of the trained computer vision model may compare facial image 412 to a reference facial image of the user (i.e., an authorized user of the authorized user account attempting to be accessed). As mentioned previously, some examples include one or more identification features being stored in association with each authorized user account, as depicted in FIG. 2A. In one or more examples, an embedding representing a reference facial image of the user (e.g., a known valid image of the authorized user's face) may be stored within using one or more of identification features A-N.

In some embodiments, the captured image may be input to the facial recognition component of trained computer vision model 212. The facial recognition component may apply one or more data transformation operations to the image data to generate an embedding representing the captured image. The embedding represents the captured image in an embedding space, which can characterize aspects of the captured image in a lower-dimensional space, thereby saving memory, improving processing speeds, and improving integration in various machine learning tasks. In some embodiments, the generated embedding may be compared with at least one embedding representing a reference facial image of the user. In one or more examples, this embedding may be generated in advance and stored in association with the user's identification features. Furthermore, in some embodiments, the generated embedding may be compared with one or more embeddings representing a reference image depicting an exemplary entity-issued identification document. For example, as mentioned above with reference to FIG. 2D, list of entities 240 may store ID card reference images (e.g., images_E1-EM) each depicting a portion or all of a verified identification document issued by a corresponding entity. In one or more examples, multiple reference images may be stored (e.g., one depicting an example of the entity's logo, one depicting an example of the entity's name design, etc.) for each entity.

The comparison may indicate how similar the two (or more) embeddings are to one another. If the similarity is greater than a threshold similarity, then the captured image may be verified as depicting a real instance of a particular entity-issued identification document. In some embodiments, if multiple comparisons are performed (e.g., one comparing the captured facial image and a stored reference facial image, one comparing a captured logo image and a stored reference logo image, etc.), the similarity scores may be aggregated (e.g., via a weighted linear combination), and the aggregated score compared to the threshold similarity score. Similarity scores exceeding a threshold similarity score may indicate that the captured image does depict the entity-issued user-specific identification document, and thus the request to provide access to the authorized user account may be granted. Some example metrics that may be used to determine the similarity score may include an L2 distance, a Manhattan distance, and the like. For example, a distance between a location in the embedding space of the captured image derived embedding and a location in the embedding space of the reference image derived embedding may indicate how similar the captured image (or a portion thereof) is to the reference image. Smaller distances may indicate that the captured image depicts the same or similar content as the reference image, while larger distances indicate that the captured image differs from the reference image.

The character recognition component of the trained computer vision model (e.g., computer vision model 212) may be trained to compute a character recognition confidence score indicating a likelihood that at least a portion of the image depicts one or more alphanumeric characters known to present on the real instance of the physical user identification card. As an example, with reference again to FIG. 4, entity-user identification number 416 may be detected by the character recognition component of computer vision model 212. The character recognition component may identify the alphanumeric characters within entity-user identification number 416 may compare them to a stored entity-identification number of the user. For example, identification features A-N may include the user's entity identification number. If the character recognition component of computer vision model 212 determines that entity-user identification number 416 from the captured image matches the stored entity-identification number, then this may indicate that the request to grant access to the authorized user account may be granted.

The logo recognition component of the trained computer vision model (e.g., computer vision model 212) may be trained to compute a logo recognition confidence score indicating a likelihood that at least a portion of the image depicts at least a portion of a logo known to be present on the real instance of the physical user identification card. For example, logo 414 may depict an object, and the logo recognition component of computer vision model 212 may compare a representation of logo 414 (e.g., an embedding representing logo 414) with a reference representation of a reference logo known to be associated with a particular entity. If the comparison indicates that the representation of logo 414 and the reference representation match (e.g., have a similarity score satisfying a similarity threshold condition), then a request to provide access to the authorized user account may be granted.

In some examples, one or more of the facial recognition confidence scores, the character recognition confidence score, or the logo recognition confidence score may be used to compute the user identification card score. The user identification card score may be determined, in this example, based on a weighted combination of the at least one of the facial recognition confidence scores, the character recognition confidence score, and/or the logo recognition confidence score.

In some embodiments, authentication subsystem 114 may be configured to generate an authorized access result indicating that access to the authorized account has been granted or denied. The authorized access result may be generated based on the user identification card score and a threshold condition. If the threshold condition is satisfied, then authentication subsystem 114 may generate the authorized access result indicating that access to the authorized account has been granted. Alternatively, if the threshold condition is not satisfied, authentication subsystem 114 may generate the authorized access result indicating that access to the authorized account has been denied.

In some embodiments, authentication subsystem 114 may be configured to provide, based on the user identification card score being greater than or equal to a threshold confidence score, indicating that the image depicts the real instance of the physical user identification card of the user, access to the authorized user account of the user. In some examples, the threshold condition being satisfied may comprise the user identification card score being less than a threshold confidence score, or less than a first threshold confidence score but also greater than a second threshold confidence score.

If authentication subsystem 114 determines that the authorized access result indicates access to the authorized account has been granted, then the triggering action (e.g., modifying private/confidential user information, requesting completion of a financial transaction, etc.) may be authorized to proceed. In some embodiments, the authorized access result may cause additional user interface data to be transmitted to the user device, such as an interface for enabling inputs to be provided (e.g., to update the private confidential user information).

Returning to FIG. 1, in some embodiments, request subsystem 110 may be configured to receive multiple requests at separate times. For example, the request to access the authorized user account of the user may be a first request received at a first time and request subsystem 110 may further be configured to receive a second request to access the authorized user account at a second time. In one or more examples, the second time is subsequent to (i.e., later) the first time. Using the trained artificial intelligence model, another entity-issued user-specific identification document predicted to be currently possessed by the user may be determined based on the second request, the prior interactions of the user, and the list of entities known to issue tangible identification documents. In one or more examples, the other entity-issued user-specific identification document differs from the entity-issued user-specific identification document (e.g., issued by two different entities). In some embodiments, computing system 102, and particularly authentication subsystem 114, may determine whether access to the authorized user account is granted or denied based on the other entity-issued user-specific identification document.

In some embodiments, a "user interface" may comprise a human-computer interaction and communication in a device and may include display screens, keyboards, a mouse, and the appearance of a desktop. For example, a user interface may comprise a way a user interacts with an application or a website.

As referred to herein, a dataset may include a collection of related sets of information that is composed of separate elements but can be manipulated as a unit by a computer. The dataset may comprise any content.

The system may monitor content generated by the user and/or about the user to generate user profile data. In some embodiments, "a user profile" and/or "user profile data" may comprise data actively and/or passively collected about a user. For example, the user profile data may comprise content generated by the user and a user attribute for the user. A user profile may be content consumed and/or created by a user. In some embodiments, an attribute may include identification information about a user and/or information included in a directory of stored user settings, preferences, and information for the user. For example, a user profile may have the settings for the user's installed programs and operating system. In some embodiments, the user profile may be a visual display of personal data associated with a specific user or a customized desktop environment. In some embodiments, the user profile may be a digital representation of a person's identity. The data in the user profile may be generated based on the system actively or passively monitoring.

Figure 5:
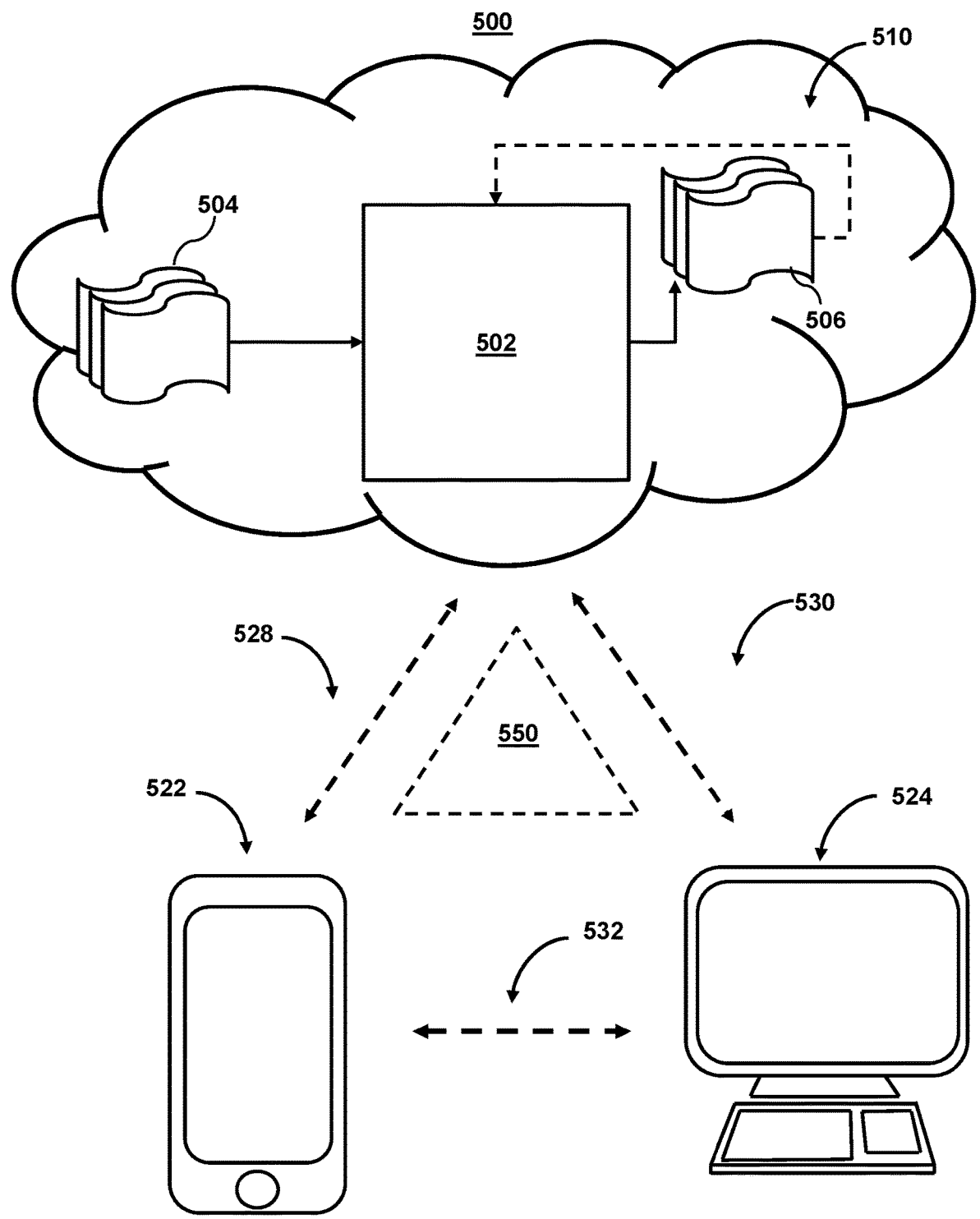
FIG. 5 is an illustrative diagram of another example system for providing cryptographically-secure access to an authorized user account, in accordance with various embodiments

FIG. 5 shows illustrative components of a system used for providing cryptographically-secure access to an authorized user account, in accordance with one or more embodiments. For example, FIG. 5 may show illustrative components for providing cryptographically-secure access to an authorized user account. As shown in FIG. 5, system 500 may include mobile device 522 and user terminal 524. While shown as a smartphone and personal computer, respectively, in FIG. 5, it should be noted that mobile device 522 and user terminal 524 may be any computing device, including, but not limited to, a laptop computer, a tablet computer, a handheld computer, and other computer equipment (e.g., a server), including "smart," wireless, wearable, and/or mobile devices. FIG. 5 also includes cloud components 510. In some embodiments, mobile device 522 and/or user terminal 524 may represent examples of client devices 104.

Cloud components 510 may alternatively be any computing device as described above and may include any type of mobile terminal, fixed terminal, or other device. For example, cloud components 510 may be implemented as a cloud computing system and may feature one or more component devices. In some embodiments, computing system 102 of FIG. 1 may be implemented as cloud components 510. It should also be noted that system 500 is not limited to three devices. Users may, for instance, utilize one or more devices to interact with one another, one or more servers, or other components of system 500. It should be noted that, while one or more operations are described herein as being performed by particular components of system 500, these operations may, in some embodiments, be performed by other components of system 500. As an example, while one or more operations are described herein as being performed by components of mobile device 522, these operations may, in some embodiments, be performed by components of cloud components 510. In some embodiments, the various computers and systems described herein may include one or more computing devices that are programmed to perform the described functions. For example, the functionalities described above with respect to subsystems 110-116 may be implemented via one or more computing devices programmed to perform the aforementioned functions. Additionally, or alternatively, multiple users may interact with system 500 and/or one or more components of system 500. For example, in one embodiment, a first user and a second user may interact with system 500 using two different components.

With respect to the components of mobile device 522, user terminal 524, and cloud components 510, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 5, both mobile device 522 and user terminal 524 include a display upon which to display data.

Additionally, as mobile device 522 and user terminal 524 are shown as a touchscreen smartphone and a personal computer, these displays also function as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 500 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, virtual private networks, and/or other virtual storage resources). The electronic storages may store software algorithms, information determined by the processors, information obtained from servers, information obtained from client devices, or other information that enables the functionality as described herein.

FIG. 5 also includes communication paths 528, 530, and 532. Communication paths 528, 530, and 532 may include the Internet, a mobile phone network, a mobile voice or data network (e.g., a 5G or LTE network), a cable network, a public switched telephone network, or other types of communications networks or combinations of communications networks. Communication paths 528, 530, and 532 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 510 may include one or more of the components described in FIG. 1. For example, computing system 102, or one or more of subsystems 110-116, may be implemented using cloud components 510. Cloud components 510 may also include model 502, which may be a machine learning model, artificial intelligence model, etc. (which may be referred to collectively as "models" herein). For example, model 502 may correspond to ID possession prediction model 210, computer vision model 212, or any other model stored in model database 124. In some embodiments, model 502 may represent an untrained model or a model being trained, however persons of ordinary skill in the art will recognize that this is exemplary and model 502 may be a trained artificial intelligence model.

In some embodiments, model training subsystem 116 may be configured to obtain user interaction data for a plurality of users each having a respective authorized user account. For example, user interaction data 220 for each user (e.g., the users associated with authorized user accounts UA1-UAN stored in user account database 122) may include a plurality of prior interactions of that user with a respective set of entities (e.g., entities E1-EN). In one or more embodiments, model training subsystem 116 may be configured to extract contextual information associated with each of the plurality of prior interactions from the user interaction data of each of the plurality of users. The contextual information may include, for example, an entity associated with each transaction, a location of each transaction, a transaction time, and the like.

Based on the list of entities 240 known to issue tangible identification documents, model training subsystem 116 may be configured to determine a document-possession classification result for each of the plurality of prior interactions of each of the plurality of users. The document-possession classification result can indicate, for a given prior interaction, whether the user possessed the corresponding entity-issued user-specific identification document and/or a likelihood that the user possesses the corresponding entity-issued user-specific identification document.

Model training subsystem 116 may further be configured to generate training data comprising, for each of the plurality of prior interactions, the contextual information extracted for the prior interaction and the document-possession classification result associated with the prior interaction. In some embodiments, model training subsystem 116 may further be configured to train the artificial intelligence model using the training data. For example, the training data, which may be stored in model database 124, may be split into training, testing, and validation data sets, and a training process to train the model, test the model, and validate the model may be performed. Model training subsystem 116 may also be configured to re-train and/or reset a model. For example, a model can be re-trained upon development of new/updated training data. As another example, a model can be reset and trained by initializing the model configurations (e.g., weights, biases). This reset may occur, for instance, in scenarios where the model could not be validated or the model has produced inaccurate results.

In some embodiments, model training subsystem 116 may further be configured to obtain reference image data comprising images of entity-issued user-specific identification documents associated with each entity included in the list of entities, as well as training image data including images of candidate user-specific identification documents associated with each entity included in the list of entities. For example, list of entities 240 may include the reference image data. Model training subsystem 116 may generate training data including the reference image data and the training image data. This training data may be used, for example, to train the computer vision model (e.g., computer vision model 212). For example, the computer vision model may be provided with inputs comprising training images depicting training examples of entity-issued user-specific identification documents. The computer vision model may process the training images (e.g., generating embeddings representing the training images in an embedding space) and calculate a likelihood score indicating a likelihood that each training image depicts one of the known reference examples of an entity-issued user-specific identification document. In some embodiments, a vector of scores, each corresponding to one reference example entity-issued user-specific identification document, may be output by the computer vision model. In some examples, the vector may be passed to a classifier which determines a classification result for the given input, where the classification result indicates whether the model believes the training example depicts a known reference example entity-issued user-specific identification document, the specific reference example entity-issued user-specific identification document (if one is identified), and a confidence score in the prediction. In one or more examples, the known reference example associated with each training example may be used as reference feedback information to determine a model loss, which can then be used as a basis to optimize the model configurations.

Model 502 may take inputs 504 and provide outputs 506. The inputs may include multiple datasets, such as a training dataset and a test dataset. Each of the plurality of datasets (e.g., inputs 504) may include data subsets related to user data, predicted forecasts and/or errors, and/or actual forecasts and/or errors. In some embodiments, outputs 506 may be fed back to model 502 as input to train model 502 (e.g., alone or in conjunction with user indications of the accuracy of outputs 506, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., consistency of labels, predicted labels, version metadata, etc.). As an example, if model 502 corresponds to ID possession prediction model 210, inputs 504 may include user interaction data (e.g., user interaction data 220) and outputs 506 may include predicted likelihoods that the user currently (e.g., at the present time when the request to access the authorized user account was received) has a particular entity-issued user-specific identification document on their person (e.g., in one's wallet, bag, pocketbook, etc.). As another example, if model 502 corresponds to computer vision model 212, inputs 504 may include an image depicting a candidate entity-issued user-specific identification document and outputs 506 may include a user identification card score and/or an authorized access result.

To train model 502, training data may be retrieved by model training subsystem 116 of FIG. 1 from model database 124. The training data may be stored in model database 124. In some examples, the training data may be selected from a plurality of training data sets based on the particular type of model being trained. For example, if ID possession prediction model 210 is being trained, the training data may include user interaction data of a plurality of existing users each having their own authorized user account with service provider 140 (or another service provider). In this example, model 502 may input 504 may correspond to the training data, and the outputs may comprise predictions of entity-issued user-specific identification cards a given user is believed to carry on their persons. The training data in this example may also include reference feedback information indicating a ground truth of whether the user, based on the conditions associated with the inputs, possessed the entity-issued user-specific identification document. In a variety of embodiments, model 502 may update its configurations (e.g., weights, biases, or other parameters) based on the assessment of its prediction (e.g., outputs 506) and reference feedback information (e.g., user indication of accuracy, reference labels, or other information). Thus, the configurations may be updated based on the assessment of whether model 502 accurately predicted the entity-issued user-specific identification document currently possessed by the user. In a variety of embodiments, where model 502 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 502 may be trained to generate better predictions.

In some embodiments, model 502 may include an artificial neural network. In such embodiments, model 502 may include an input layer and one or more hidden layers. Each neural unit of model 502 may be connected with many other neural units of model 502. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 502 may be self-learning and trained, rather than explicitly programmed, and can perform significantly better in certain areas of problem solving as compared to traditional computer programs. During training, an output layer of model 502 may correspond to a classification of model 502, and an input known to correspond to that classification may be input into an input layer of model 502 during training. During testing, an input without a known classification may be input into the input layer, and a determined classification may be output.

In some embodiments, model 502 may include multiple layers (e.g., where a signal path traverses from front layers to back layers). In some embodiments, backpropagation techniques may be utilized by model 502 where forward stimulation is used to reset weights on the "front" neural units. In some embodiments, stimulation and inhibition for model 502 may be more free-flowing, with connections interacting in a more chaotic and complex fashion. During testing, an output layer of model 502 may indicate whether or not a given input corresponds to a classification of model 502.

System 500 also includes API layer 550. API layer 550 may allow the system to generate summaries across different devices. In some embodiments, API layer 550 may be implemented on mobile device 522 or user terminal 524. Alternatively, or additionally, API layer 550 may reside on one or more of cloud components 510. API layer 550 (which may be a REST or web services API layer) may provide a decoupled interface to data and/or functionality of one or more applications. API layer 550 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services as well as for exchanging information with partners in B2B transactions.

API layer 550 may use various architectural arrangements. For example, system 500 may be partially based on API layer 550, such that there is strong adoption of SOAP and RESTful web services, using resources like Service Repository and Developer Portal, but with low governance, standardization, and separation of concerns. Alternatively, system 500 may be fully based on API layer 550, such that separation of concerns between layers like API layer 550, services, and applications are in place.

In some embodiments, the system architecture may use a microservice approach. Such systems may use two types of layers: front-end layer and back-end layer where microservices reside. In this kind of architecture, the role of API layer 550 may provide integration between front-end and back-end. In such cases, API layer 550 may use RESTful APIs (exposition to front-end or even communication between microservices). API layer 550 may use AMQP (e.g., Kafka, RabbitMQ, etc.). API layer 550 may use incipient usage of new communications protocols such as gRPC, Thrift, etc.

In some embodiments, the system architecture may use an open API approach. In such cases, API layer 550 may use commercial or open-source API platforms and their modules. API layer 550 may use a developer portal. API layer 550 may use strong security constraints applying WAF and DDoS protection, and API layer 550 may use RESTful APIs as standard for external integration.

Figure 6A:
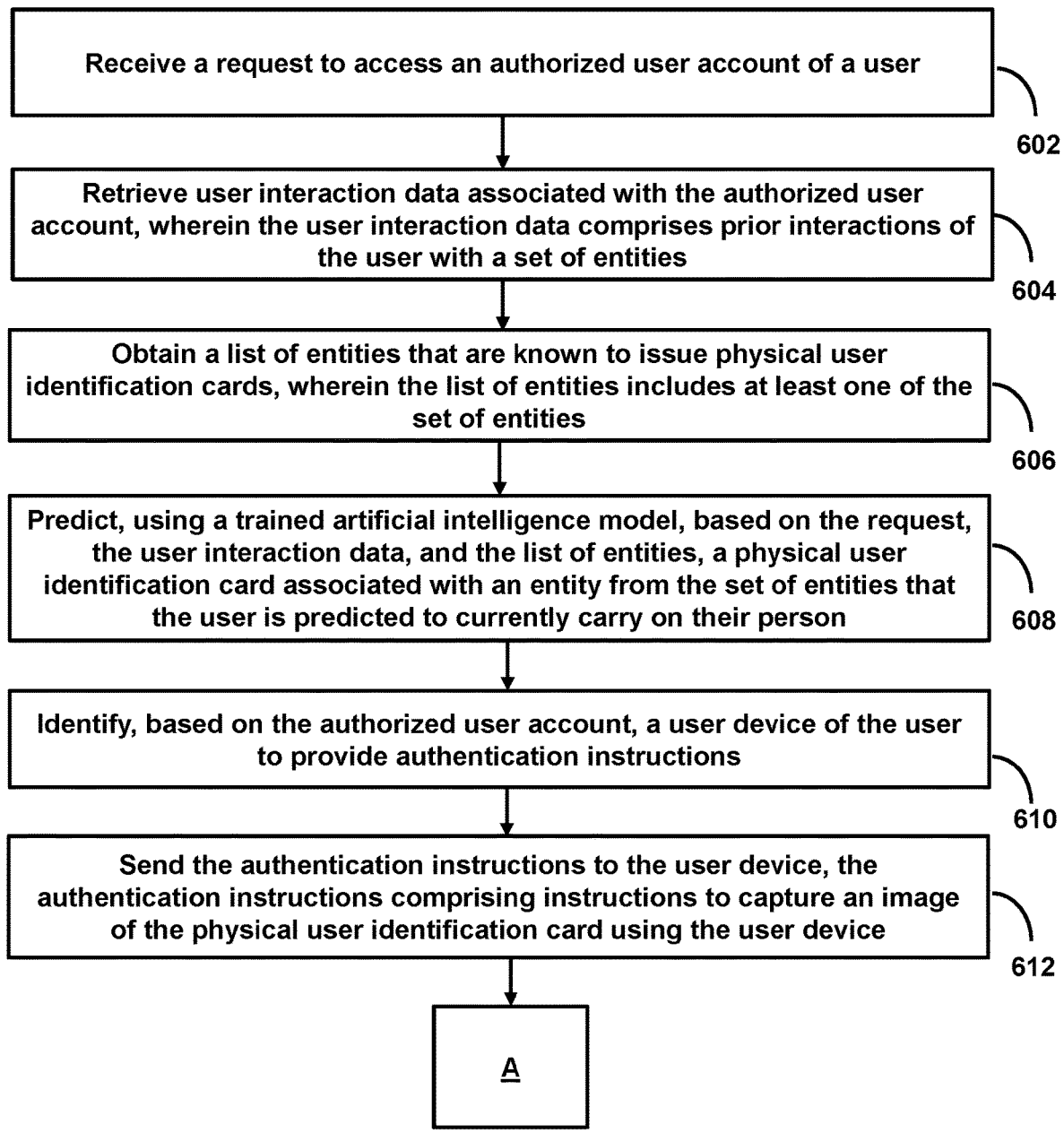
FIGS. 6A-6B illustrate a flowchart of an example process for providing cryptographically-secure access to an authorized user account, in accordance with various embodiments.
Figure 6B:
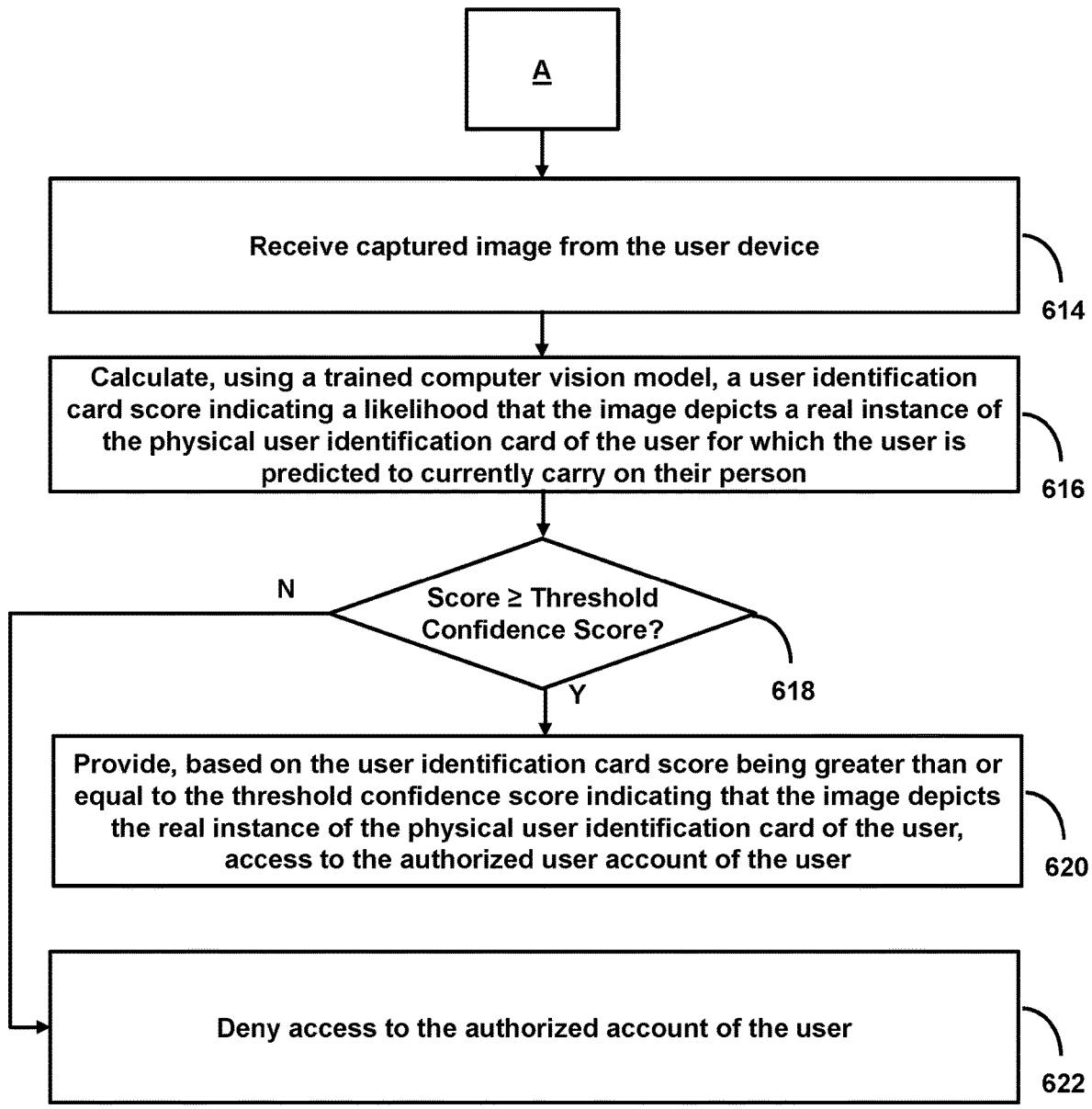

FIGS. 6A-6B illustrate a flowchart of an example process 600 for providing cryptographically-secure access to an authorized user account, in accordance with various embodiments. Persons of ordinary skill in the art will recognize that the ordering of steps is not intended to be immutable, and certain steps may be performed in a different order. Furthermore, while the steps are described with respect to aspects of computing system 102, some steps, or aspects thereof, may be performed by other devices (e.g., client devices 104, service provider 140, etc.).

In some embodiments, process 600 may begin at step 602. At step 602, a request to receive access to an authorized user account of a user may be received. In some examples, the request may be received in response to an attempt being made to access the authorized user account. The attempt may be related to an update to private/confidential information stored within the authorized user account, to access payment information (e.g., credit card number, banking numbers, etc.) associated with the authorized user account, communicate with one or more components of system 100 (e.g., service provider 140), and the like. In some embodiments, step 602 may be performed by a subsystem that is the same or similar to request subsystem 110.

At step 602, user interaction data associated with the authorized user account may be retrieved. In one or more examples, the user interaction data may be stored in user interaction data database 126. Separate user interaction data (e.g., user interaction data 220) may be stored for each authorized user account (e.g., authorized user accounts UA1-UAN). The user interaction data comprises prior interactions of the user with a set of entities. For example, user interaction data 220 may include interactions I1-IN indicating various prior interactions that the corresponding user had with a set of entities (e.g., entities E1-EN, respectively). In some embodiments, step 604 may be performed by a subsystem that is the same or similar to request subsystem 110.

At step 606, a list of entities that are known to issue physical user identification cards may be obtained. For example, list of entities 240 may be stored in entity list database 128. Each entity included within the list of entities 240 may be known to issue a tangible identification document for interacting with various services offered by that entity (e.g., food purchasing, content rental, etc.). In some examples, list of entities 240 may include reference image data comprising images of known reference examples of the entity-issued user-specific identification document. The reference example images may be stored in entity list database 128, for example within list of entities 240, however embeddings or other representations of the reference example images (or pointers to locations where the images, embeddings, and/or representations are located) may also or alternatively be stored within entity list database 128. In one or more examples, the list of entities may include at least one entity included within the set of entities from the user interaction data. For example, entity E1 may be associated with a prior user interaction (e.g., transaction TX1), and entity E1 may also be included within the list of entities 240 indicating that entity E1 is known to issue a tangible identification document. In some embodiments, step 606 may be performed by a subsystem that is the same or similar to Identification & detection subsystem 112.

At step 608, a physical user identification card associated with an entity from the set of entities that the user is predicted to currently carry on their person may be predicted. The prediction may be performed using a trained artificial intelligence model and may be based on the received request, the user interaction data, and the list of entities. In some embodiments, the trained artificial intelligence model may predict a likelihood that the user carries each entity-issued user-specific identification document on their person. The trained artificial intelligence model may then select the entity-issued user-specific identification document having the greatest predicted likelihood. In one or more examples, multiple entity-issued user-specific identification documents may be predicted to be carried by the user. In some embodiments, step 608 may be performed by a subsystem that is the same or similar to Identification & detection subsystem 112.

At step 610, a user device of the user may be identified based on the authorized user account. The user device may be identified for providing authentication instructions for the user to determine whether access to the authorized user account can be granted. In one or more examples, an indication of the user device and/or identification information for the user device may be determined based on the identification features stored in user account database 122. For example, a phone number, email address, or other contact means can be stored as an identification feature associated with an authorized user account. In some embodiments, step 610 may be performed by a subsystem that is the same or similar to authentication subsystem 114.

At step 612, the authentication instructions may be sent to the user device. The authentication instructions may include instructions to cause an image of the physical user identification card to be captured using the user device. For example, the authentication instructions may include user interface data for rendering a user interface (e.g., user interface 400) on the user device (e.g., client device 104). As mentioned above, the user interface may include a portion displaying a view of an image capturing component of the user device (e.g., portion 406). The user may be instructed to position their user device in a manner to enable capturing of an image of the entity-issued user-specific identification document that the trained artificial intelligence model predicted the user currently is in possession of (i.e., the physical identification document is on the user's persons or within easy access of the user). In some embodiments, step 612 may be performed by a subsystem that is the same or similar to authentication subsystem 114.

At step 614, a captured image may be received from the user device. In some embodiments, the captured image may depict a candidate entity-issued user-specific identification document. For example, candidate entity-issued user-specific identification document 410 may be depicted within the image captured using client device 104. In some embodiments, the image may be captured manually by the user (e.g., using GUI 408), however the user interface data included in the authentication instructions may include code to cause an automatic image capture to be performed. In some embodiments, step 614 may be performed by a subsystem that is the same or similar to authentication subsystem 114.

At step 616, a user identification card score may be calculated using a trained computer vision model. The user identification card score may indicate a likelihood that the image depicts a real instance of the physical user identification card of the user for which the user is predicted to currently carry on their person. For example, ID possession prediction model 210 may predict that the user is currently in possession of a physical user identification document issued by a first entity, entity E1. The authentication instructions may cause the user device to capture an image depicting the physical user identification document. The trained computer vision model may compare the captured image with a known reference image of a reference example identification document issued by the first entity to determine whether the user does currently have the requested physical identification document in their possession. Thus, the user identification score may analyze the captured image and compare it against the reference image to determine how similar the images are. If the captured image is similar to the reference example image, then this may indicate that the request to access the authorized user account did originate from an authorized user. In some embodiments, the user identification card score may be computed based on one or more confidence scores associated with various components of the trained computer vision model. For example, the computer vision model may include a facial recognition component configured to determine how likely a facial image (e.g., facial image 412) depicted within a portion of the image of the candidate identification document is of the user for which access to their authorized user account is being requested. Alternatively or additionally, the computer vision model may include a character recognition component and/or a logo detection component configured to recognize characters associated with the specified entity (e.g., the name associated with entity E1, an identification number of the user with entity E1) and detect the presence of a known logo of the specified entity within the image of the candidate identification document, respectively. In some embodiments, step 616 may be performed by a subsystem that is the same or similar to authentication subsystem 114.

At step 618, a determination may be made as to whether the user identification card score is greater than or equal to a threshold confidence score. Step 618 may, for instance, determine whether a threshold condition has been satisfied. If, at step 618, it is determined that the threshold condition has been satisfied (e.g., the user identification card score is greater than or equal to the threshold confidence score), then process 600 may proceed to step 620. However, if, at step 618, it is determined that the threshold condition has not been satisfied (e.g., the user identification card score is less than the threshold confidence score), then process 600 may proceed to step 622.

At step 620, access to the authorized user account may be provided. For example, because the threshold condition has been satisfied, the request likely originated from a user authorized to access the authorized user account. In some embodiments, one or more additional authentication steps may further be required prior to fully granting access to the user (e.g., confidentiality agreements, retinal scan, fingerprint, etc.).

At step 622, access to the authorized account of the user may be denied. For example, because the user identification card score does not satisfy the threshold condition, then this indicates that the requesting user may not be an authorized user. Access to the authorized account may therefore be denied. In some examples, after access has been denied, one or more alternative authentication steps may be executed. For example, a phone call with an entity representative may be employed. Still further, some examples may request that the user capture an image of another entity-issued user-specific identification document that is the next most likely to be currently possessed by the user. In this scenario, process 600 may return to step 608 where a new prediction is made as to which entity-issued identification document the user likely has and may request that the user capture an image of that identification document.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing cryptographically-secure access to an authorized user account.
2. The method of embodiment 1, wherein the method comprises: receiving a request to access an authorized user account of a user; determining, using a trained artificial intelligence model, an entity-issued user-specific identification document predicted to be currently possessed by the user based on the request, prior interactions of the user with a set of entities, and a list of entities known to issue tangible identification documents; causing a user device associated with the user to capture an image of the entity-issued user-specific identification document using the user device; determining, using a trained computer vision model, a user identification card score based on the image; generating, based on the user identification card score and a threshold condition, an authorized access result indicating that access to the authorized user account has been granted or denied.
3. The method of any one of embodiments 1-2, wherein determining the user identification card score comprises: determining, using the trained computer vision model, a facial recognition confidence score, wherein the user identification card score is based on the facial recognition confidence score.
4. The method of any one of embodiments 1-3, wherein determining the user identification card score comprises: determining, using the trained computer vision model, a character recognition confidence score, wherein the user identification card score is based on the character recognition confidence score.
5. The method of any one of embodiments 1-4, wherein determining the user identification card score comprises: determining, using the trained computer vision model, a logo recognition confidence score, wherein the user identification card score is based on the logo recognition confidence score.
6. The method of any one of embodiments 1-5, wherein determining the user identification card score comprises: determining, using the trained computer vision model, a weighted combination of a facial recognition confidence score, a character recognition confidence score, and a logo recognition confidence score, the user identification card score comprising the weighted combination.
7. The method of any one of embodiments 1-6, further comprising: determining, based on the request, a request risk score indicating how much risk the request places on the authorized user account; and determining, based on the request risk score satisfying a request risk threshold score, that multi-factor authentication is needed to allow access to the authorized user account of the user, wherein user interaction data comprising the prior interactions of the user is retrieved based on the request risk score satisfying the request risk threshold score.
8. The method of any one of embodiments 1-7, wherein causing comprises: generating or obtaining user interface data for rendering a user interface on the user device, wherein the user interface comprises instructions for accessing an image capture component of the user device and capturing the image of a physical user identification card.
9. The method of any one of embodiments 1-8, wherein determining the entity-issued user-specific identification document comprises: generating, using the trained artificial intelligence model, a set of entity-likelihood scores respectively corresponding to the set of entities, wherein each entity has an entity-likelihood score representing a likelihood that the user carries the entity-issued user-specific identification document for the entity; and selecting the entity-issued user-specific identification document based on the entity-likelihood score associated therewith.
10. The method of any one of embodiments 1-9, further comprising: retrieving, based on the request, user interaction data associated with the authorized user account, wherein the user interaction data comprises the prior interactions of the user with the set of entities; obtaining, based on the request, the list of entities known to issue tangible identification documents; and filtering the set of entities based on the list of entities to obtain a subset of entities that are known to issue tangible identification documents and with whom the user has previously interacted, wherein the entity-issued user-specific identification document is selected from the subset of entities.
11. The method of any one of embodiments 1-10, wherein the request comprises a first request received at a first time, the method further comprises: receiving a second request to access the authorized user account at a second time subsequent the first time; determining, using the trained artificial intelligence model, another entity-issued user-specific identification document predicted to be currently possessed by the user based on the second request, the prior interactions of the user, and the list of entities known to issue tangible identification documents, wherein the other entity-issued user-specific identification document differs from the entity-issued user-specific identification document, wherein access to the authorized user account is granted or denied based on the other entity-issued user-specific identification document.
12. The method of any one of embodiments 1-11, further comprising: steps for training at least one of the trained artificial intelligence model or the trained computer vision model.
13. The method of any one of embodiments 1-12, further comprising: obtaining user interaction data of a plurality of users each having a respective authorized user account, wherein the user interaction data for each user comprises a plurality of prior interactions of that user with a respective set of entities; extracting contextual information associated with each of the plurality of prior interactions from the user interaction data of each of the plurality of users; determining, based on the list of entities known to issue tangible identification documents, a document-possession classification result for each of the plurality of prior interactions of each of the plurality of users, wherein the document-possession classification result indicates that, for a given prior interaction, the user possessed the corresponding tangible identification document; generating training data comprising, for each of the plurality of prior interactions, the contextual information extracted for the prior interaction and the document-possession classification result associated with the prior interaction; and training the artificial intelligence model using the training data.
14. The method of any one of embodiments 1-13, further comprising: obtaining reference image data comprising images of entity-issued user-specific identification documents associated with each entity included in the list of entities; obtaining training image data comprising images of candidate user-specific identification documents associated with each entity included in the list of entities; generating training data comprising the reference image data and the training image data; and training the computer vision model using the training data.
15. A tangible, non-transitory, machine-readable medium storing instructions that, when executed by a data processing apparatus, cause the data processing apparatus to perform operations comprising those of any of embodiments 1-14.
16. A system comprising one or more processors; and memory storing instructions that, when executed by the processors, cause the processors to effectuate operations comprising those of any of embodiments 1-14.
17. A system comprising means for performing any of embodiments 1-14.

What is claimed is:
1. A system for providing cryptographically-secure access to an authorized user account, the system comprising:
one or more processors programmed using computer program instructions to:
receive a request to access an authorized user account of a user;
retrieve user interaction data associated with the authorized user account, wherein the user interaction data comprises prior interactions of the user with a set of entities;
obtain a list of entities that are known to issue physical user identification cards, wherein the list of entities includes at least one of the set of entities;
predict, using a trained artificial intelligence model, based on the request, the user interaction data, and the list of entities, a physical user identification card associated with an entity from the set of entities that the user is predicted to currently carry on their person;

identify, based on the authorized user account, a user device of the user to provide authentication instructions;

send the authentication instructions to the user device, the authentication instructions comprising instructions to capture an image of the physical user identification card using the user device;

calculate, using a trained computer vision model, a user identification card score indicating a likelihood that the image depicts a real instance of the physical user identification card of the user for which the user is predicted to currently carry on their person;

provide, based on the user identification card score being greater than or equal to a threshold confidence score indicating that the image depicts the real instance of the physical user identification card of the user, access to the authorized user account of the user.

2. The system of claim 1, wherein the user identification card score is calculated based on at least one of:

a facial recognition confidence score determined using a facial recognition component of the trained computer vision model indicating a likelihood that at least a portion of the image depicts a face of the user;

a character recognition confidence score determined using a character recognition component of the trained computer vision model indicating a likelihood that at least a portion of the image depicts one or more alphanumeric characters known to present on the real instance of the physical user identification card; or a logo recognition confidence score determined using a logo recognition component of the trained computer vision model indicating a likelihood that at least a portion of the image depicts at least a portion of a logo known to be present on the real instance of the physical user identification card.

3. The system of claim 2, wherein the user identification card score is determined based on a weighted combination of the at least one of the facial recognition confidence score, the character recognition confidence score, and the logo recognition confidence score.

4. The system of claim 1, wherein the physical user identification card associated being predicted comprises the one or more processors being programmed to:

filter the list of entities based on the set of entities to identify (i) a subset of entities with whom the user has had a prior interaction and (ii) a subset of the prior interactions associated with the subset of entities; and determine, based on the subset of the prior interactions, a frequency that the user interacted with each of the subset of entities, wherein the frequency associated with each entity of the subset of entities is input to the trained artificial intelligence model to determine how likely the user carries that entities corresponding physical user identification card.

5. A method for providing cryptographically-secure access to an authorized user account, the method being implemented by one or more processors, the method comprising:

receiving a request to access an authorized user account of a user;

determining, using a trained artificial intelligence model, an entity-issued user-specific identification document predicted to be currently possessed by the user based on the request, prior interactions of the user with a set of entities, and a list of entities known to issue tangible identification documents;

causing a user device associated with the user to capture an image of the entity-issued user-specific identification document using the user device;

determining, using a trained computer vision model, a user identification card score based on the image;

generating, based on the user identification card score and a threshold condition, an authorized access result indicating that access to the authorized user account has been granted or denied.

6. The method of claim 5, wherein determining the user identification card score comprises:

determining, using the trained computer vision model, a facial recognition confidence score, wherein the user identification card score is based on the facial recognition confidence score.

7. The method of claim 5, wherein determining the user identification card score comprises:

determining, using the trained computer vision model, a character recognition confidence score, wherein the user identification card score is based on the character recognition confidence score.

8. The method of claim 5, wherein determining the user identification card score comprises:

determining, using the trained computer vision model, a logo recognition confidence score, wherein the user identification card score is based on the logo recognition confidence score.

9. The method of claim 5, wherein determining the user identification card score comprises:

determining, using the trained computer vision model, a weighted combination of a facial recognition confidence score, a character recognition confidence score, and a logo recognition confidence score, the user identification card score comprising the weighted combination.

10. The method of claim 5, further comprising:

determining, based on the request, a request risk score indicating how much risk the request places on the authorized user account; and determining, based on the request risk score satisfying a request risk threshold score, that multi-factor authentication is needed to allow access to the authorized user account of the user, wherein user interaction data comprising the prior interactions of the user is retrieved based on the request risk score satisfying the request risk threshold score.

11. The method of claim 5, wherein causing comprises:

generating or obtaining user interface data for rendering a user interface on the user device, wherein the user interface comprises instructions for accessing an image capture component of the user device and capturing the image of a physical user identification card.

12. The method of claim 5, wherein determining the entity-issued user-specific identification document comprises:

generating, using the trained artificial intelligence model, a set of entity-likelihood scores respectively corresponding to the set of entities, wherein each entity has an entity-likelihood score representing a likelihood that the user carries the entity-issued user-specific identification document for the entity; and selecting the entity-issued user-specific identification document based on the entity-likelihood score associated therewith.

13. The method of claim 5, further comprising:
retrieving, based on the request, user interaction data associated with the authorized user account, wherein the user interaction data comprises the prior interactions of the user with the set of entities;
obtaining, based on the request, the list of entities known to issue tangible identification documents; and
filtering the set of entities based on the list of entities to obtain a subset of entities that are known to issue tangible identification documents and with whom the user has previously interacted, wherein the entity-issued user-specific identification document is selected from the subset of entities.

14. The method of claim 5, wherein the request comprises a first request received at a first time, the method further comprises:
receiving a second request to access the authorized user account at a second time subsequent the first time;
determining, using the trained artificial intelligence model, additional entity-issued user-specific identification document predicted to be currently possessed by the user based on the second request, the prior interactions of the user, and the list of entities known to issue tangible identification documents, wherein the additional entity-issued user-specific identification document differs from the entity-issued user-specific identification document, wherein access to the authorized user account is granted or denied based on the additional entity-issued user-specific identification document.

15. The method of claim 5, further comprising:
steps for training at least one of the trained artificial intelligence model or the trained computer vision model.

16. The method of claim 5, further comprising:
obtaining user interaction data of a plurality of users each having a respective authorized user account, wherein the user interaction data for each user comprises a plurality of prior interactions of that user with a respective set of entities;
extracting contextual information associated with each of the plurality of prior interactions from the user interaction data of each of the plurality of users;
determining, based on the list of entities known to issue tangible identification documents, a document-possession classification result for each of the plurality of prior interactions of each of the plurality of users, wherein the document-possession classification result indicates that, for a prior interaction, the user possessed a corresponding tangible identification document;
generating training data comprising, for each of the plurality of prior interactions, the contextual information extracted for the prior interaction and the document-possession classification result associated with the prior interaction; and
training the artificial intelligence model using the training data.

17. The method of claim 5, further comprising:
obtaining reference image data comprising images of entity-issued user-specific identification documents associated with each entity included in the list of entities;
obtaining training image data comprising images of candidate user-specific identification documents associated with each entity included in the list of entities;
generating training data comprising the reference image data and the training image data; and
training the computer vision model using the training data.

18. One or more non-transitory computer-readable media storing computer program instructions that, when executed by one or more processors of a computing system, effectuate operations comprising:
receiving a request to access an authorized user account of a user;
determining, using a trained artificial intelligence model, an entity-issued user-specific identification document predicted to be currently possessed by the user based on the request, prior interactions of the user with a set of entities, and a list of entities known to issue tangible identification documents;
causing a user device associated with the user to capture an image of the entity-issued user-specific identification document using the user device;
determining, using a trained computer vision model, a user identification card score based on the image;
generating, based on the user identification card score and a threshold condition, an authorized access result indicating that access to the authorized user account has been granted or denied.

19. The one or more non-transitory computer-readable media of claim 18, wherein determining the user identification card score comprises:
determining, using the trained computer vision model, at least one of: a facial recognition confidence score, a character recognition confidence score, or a logo recognition confidence score, wherein the user identification card score is based on at least one of the facial recognition confidence score, the character recognition confidence score, or the logo recognition confidence score.

20. The one or more non-transitory computer-readable media of claim 18, wherein determining the user identification card score comprises:
generating, using the trained artificial intelligence model, a set of entity-likelihood scores respectively corresponding to the set of entities, wherein each entity has an entity-likelihood score representing a likelihood that the user carries the entity-issued user-specific identification document for the entity; and
selecting the entity-issued user-specific identification document based on the entity-likelihood score associated therewith.

* * * * *